(12) United States Patent
Lukes

(10) Patent No.: US 6,547,836 B1
(45) Date of Patent: Apr. 15, 2003

(54) PROCESS FOR OBTAINING MONOHYDRATED LITHIUM SULFATE FROM NATURAL BRINES

(75) Inventor: Jerome Lukes, Salt Lake City, UT (US)

(73) Assignee: SQM Salar S.A., Santiago (CL)

( * ) Notice: Subject to any disclaimer, the term of this patent is extended or adjusted under 35 U.S.C. 154(b) by 0 days.

(21) Appl. No.: 09/435,606

(22) Filed: Nov. 8, 1999

(30) Foreign Application Priority Data

Nov. 10, 1998  (CL) .............................................. 2723-98

(51) Int. Cl.[7] .............................................. C22B 26/00
(52) U.S. Cl. ..................... 23/298; 23/302 R; 23/295 S; 423/179.5
(58) Field of Search .............................. 23/298, 302 R, 23/295 S; 423/179.5, 551

(56) References Cited

U.S. PATENT DOCUMENTS

| | | | | |
|---|---|---|---|---|
| 4,287,163 A | * | 9/1981 | Garrett et al. | 23/298 |
| 4,723,962 A | | 2/1988 | Mehta | 23/298 |
| 4,980,136 A | * | 12/1990 | Brown et al. | 423/179.5 |
| 5,219,550 A | * | 6/1993 | Brown et al. | 423/179.5 |
| 5,676,916 A | * | 10/1997 | Wilkomirsky | 423/279 |
| 5,939,038 A | * | 8/1999 | Wilkomirsky | 423/276 |
| 5,993,759 A | * | 11/1999 | Wilkomirsky | 423/179.5 |

FOREIGN PATENT DOCUMENTS

| | | |
|---|---|---|
| CL | 31513 | 11/1923 |
| CL | 33867 | 9/1983 |

* cited by examiner

Primary Examiner—Steven Bos
(74) Attorney, Agent, or Firm—Birch, Stewart, Kolasch & Birch, LLP

(57) ABSTRACT

A process for obtaining monochlorated lithium sulfate from natural brines by mixing two brines: one saturated or nearly saturated with silvite (KCl), carnallite (KCl, $MgCl_2.6H_2O$), and lithium sulfate ($Li_2SO_4.H_2O$), with a magnesium content of 4.7–6%, 0.8–1.2% lithium, and 1.2–4.2% total sulfate; and the other brine is saturated with bischofite ($MgCl.6H_2O$), monohydrated lithium sulfate ($Li_2SO_4.H_2O$), and carnallite (KCl, $MgCl_2.6H_2O$), and with a lithium content of 2.5–6%, below 6% magnesium, and less than 0.2% total sulfate, such that the resulting brine achieves a lithium sulfate content that exceeds its solubility in the brine, hereby it precipitates as monohydrated lithium sulfate. Crystallization can be accomplished in three stages in order to separate the carnallite from the lithium sulfate by filtering and washing it so as to enhance its purity and then drying the product if the goal is to retain anhydrous lithium sulfate.

27 Claims, 5 Drawing Sheets

PROCESS FOR OBTAINING MONOHYDRATED LITHIUM SULFATE FROM NATURAL BRINES

SPECIFICATION

Figure 1:
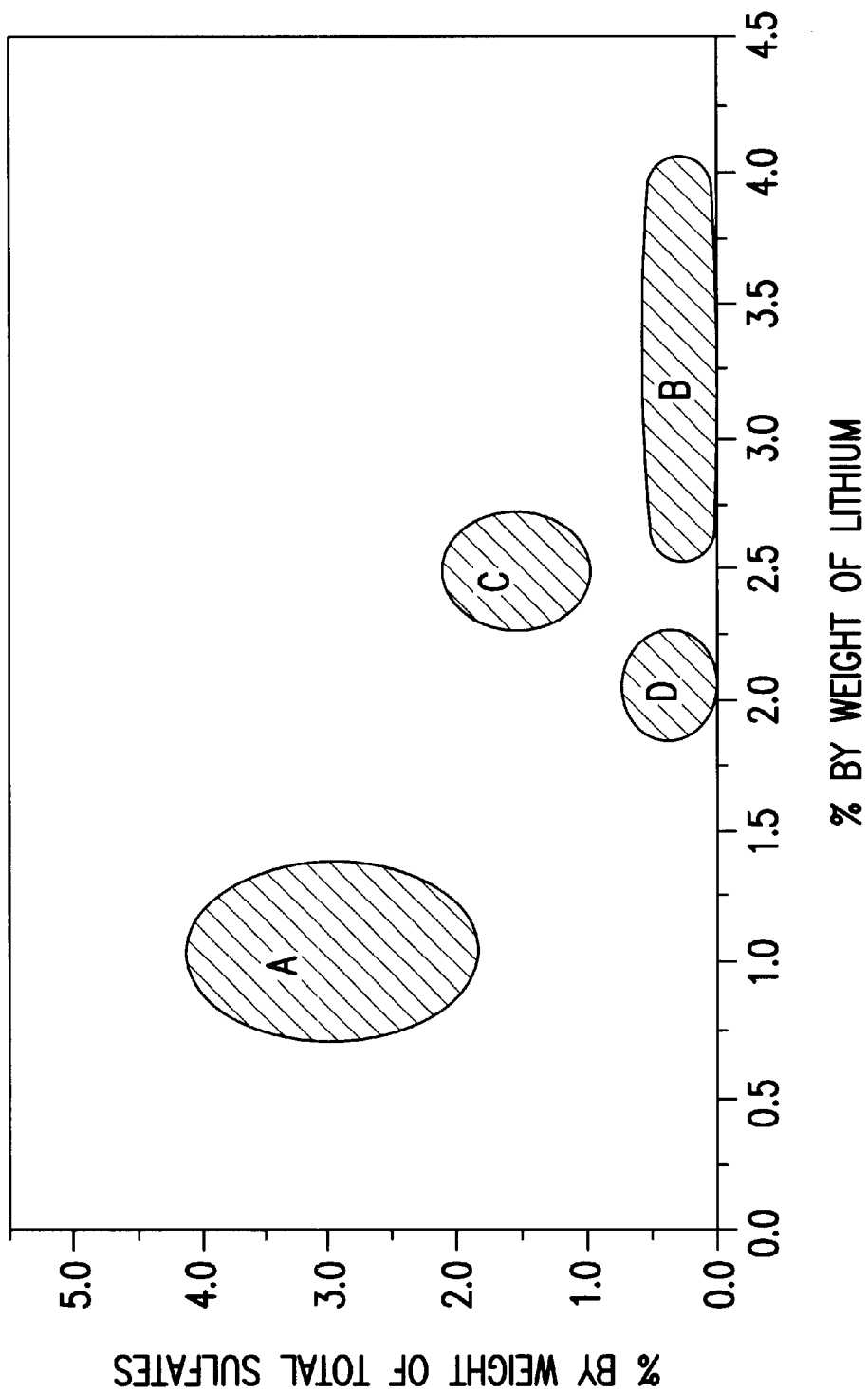

Natural brines that exist in salt deposits such as the Atacama Salt Deposit contain considerable amounts of sodium, potassium, boron, lithium, and calcium in the form of chlorides and sulfates, as well as other elements in smaller quantities such as bromine, strontium, silica, iron, iodine, etc.

Owing to the commercial value of some of these elements or compounds that can be obtained from brines, the brines are generally processed by solar evaporation in order to crystallize out the desired product or products or to eliminate others of less commercial value. In the first stages of crystallization, brines that are high in chlorides produce salts such as halite (NaCl), silvite (KCl), silvinite (NaCl, KCl), carnallite (KCl, $MgCl_2.6H_2O$), and bischofite ($MgCl_2.6H_2O$). Brines with sulfates can precipitate salts such as epsomite ($MgSO_4.7H_2O$), kieserite ($MgSO_4.H_2O$), gypsum ($CaSO_4.2H_2O$), singinite ($CaSO_4, K_2SO_4.H_2O$), schoenite ($Na_2SO_4, K_2SO_4.6H_2O$), and lithium sulfate ($Li_2SO_4.H_2O$), in addition to other double salts of sulfates and chlorides such as kainite (KCl, $MgSO_4.2.75H_2O$) and lithium schoenite ($LiSO_4 K_2SO_4$).

When the goal is to recover the lithium in the form of hydrated lithium sulfate ($Li_2SO_4.H_2O$) contained in brines that are high in sulfates, such as those from Atacama Deposit, the lithium sulfate is contaminated with other sulfates that can precipitate with it, such as kainite, epsomite, schoenite, or lithium schoenite, even though other salts can also precipitate at various stages of the crystallization process, such as chloride salts if they are present in sufficiently high proportions, e.g., bischofite and carnallite. All other salts are undesirable if the intention is to recover lithium since they contaminate the product and it is difficult and expensive to purify the product if the goal is to obtain lithium sulfate of high purity, above 98–99%.

In order to produce lithium sulfate from natural brines from salt deposits, various techniques have been proposed such as precipitating double compounds of lithium as a final product. For example, in Chilean Patent No. 33,867 by N. Parada and L. F. Vergara ("Process for Producing Potassium Sulfate and Lithium Salts from a Mixture of Double Salts of Lithium, Potassium, and Magnesium"), sodium, potassium, and magnesium salts are precipitated in succession until a mixture is produced of composite salts of schoenite and lithium schoenite, which are then separated by selective flotation followed by lixiviation with water at room temperature in order to obtain a solid with a lithium schoenite purity of approximately 95%. This brine is then reacted with potassium chloride at room temperature by means of a metathesis reaction in order finally to obtain a lithium chloride brine that can be used to precipitate lithium carbonate by conventional means by precipitating it with soda ash.

In another Chilean patent, No. 31.513 from the Comité de Sales Mixtas de Corfo [Corfo Committee for Mixed Salts] ("New Process for Extracting the Lithium Contained in the Salt Deposits of the Atacama Salt Deposit in the Form of Crystallized Monohydrated Lithium Sulfate"), brines that are first concentrated by solar evaporation and have lithium contents of 11–14 gpl, such as lithium chloride, are treated with brines that are high in magnesium sulfate in an interchange reaction or "salting-out" that makes it possible to precipitate monohydrated lithium sulfate. The resulting solution is again evaporated until 11–14 gpl of lithium is obtained, and the process is repeated in order to separate additional hydrated lithium sulfate. The process, however, requires considerable quantities of magnesium sulfate (generally in the form of epsomite, $MgSO_4.7H_2O$) that has to be added at approximately 50% excess above stoichiometric in order to implement the displacement reaction:

$$2LiCl+MgSO_4 \rightarrow Li_2SO_4.H_2O+MgCl_2.$$

However, the product that is obtained (hydrated lithium sulfate) has a purity of only 95%, with 5% precipitated magnesium sulfate; this limits the subsequent use of the lithium sulfate that is obtained in this way.

In another patent that relates to the precipitation of lithium sulfate from brines (U.S. Pat. No. 4,287,163 by D. E. Garrett and M. Laborde "Process for Recovering Lithium Monohydrate"), a process is described that is similar to that set forth in Chilean Patent 31.513 (since the Comité de Sales Mixtas de Corfo is a participant in both) in which a soluble sulfate, such as magnesium sulfate or sodium sulfate or even sulfuric acid, is added to brines from the Atacama Salt Deposit that are first evaporated in order to concentrate them and that have lithium contents of more than 0.4% by weight and less than 30 moles of magnesium chloride per 1000 moles of water, in order to precipitate out the hydrated lithium sulfate, whereby the salt that is preferred for this process is epsomite ($MgSO_4.7H_2O$), which is precipitated by cooling the brine. The process produces a low-purity lithium sulfate since when, for example, magnesium sulfate is used as the salt for precipitating lithium, the lithium sulfate that is obtained has a purity of 95.5%, with 4.3% precipitated magnesium sulfate and a lithium recovery rate from the brine of only 32%. When sodium sulfate is used, the precipitated lithium sulfate is also of low quality, with a content of 24.32% of lithium sulfate, which is contaminated with 18.5% sodium sulfate and 52.1% sodium chloride and a lithium recovery rate of only 6.3%. If the precipitation agent is replaced with sulfuric acid, the product that is obtained is also of low quality since it has 22.8% lithium sulfate contaminated with 77.2% boric acid and lithium recovery rate from the brine 17.6%.

U.S. Pat. No. 4,723,962 by V. C. Mehta ("Process for Recovering Lithium from Salt Brines") describes another process in which monohydrated lithium sulfate is precipitated from natural brines that contain chlorides and sulfates through an initial step of cooling said brine to a temperature of between 4 and 10° C. in order to precipitate NaCl, followed by the addition of water and subsequent cooling of the resulting brine to 0° C. in order to precipitate hydrated magnesium sulfate, then evaporating the resulting brine to approximately 90% of the saturation value of lithium, whereby it is then mixed with starting brine in proportions such as to obtain a potassium-lithium molar ratio of less than approximately 0.35. The brine mixture that is obtained in this way is cooled to 0° C. in order to precipitate carnallite ($MgCl_2 KCl.6H_2O$), and then the evaporation of the resulting brines continues, but salts of this brine are kept from precipitating. Then magnesium sulfate (epsomite) is added in order to produce a sulfate level of 60% by weight compared to the total water contained, under which conditions the monohydrated lithium sulfate precipitates. After various stages of washing, filtration, and drying of the crystals, the above-described process produces a hydrated lithium sulfide with a purity of 92% and a lithium recovery rate of 76% from the lithium-concentrated brine.

As will be noted, in all of these patents the processes use a salt (sulfate), generally of magnesium, such as epsomite in order to precipitate the hydrated lithium sulfate, either by a simple interchange reaction (salting-out), by cooling the resulting brine in order to precipitate it, or by precipitation as double lithium compounds and then lixiviation, whereby in all cases a monohydrated lithium sulfate is obtained with a purity of no greater than 95% and variable recovery rates that cannot exceed 76%.

In this invention, unlike the above-described and previously proposed processes, advantage is taken of the fact that when a brine that contains magnesium and lithium as sulfates is concentrated, the solubility of the lithium sulfate rapidly decreases as the concentration of lithium increases in the range of 1–2% Li, such that if a brine that is saturated with carnallite (KCl MgCl$_2$.6H$_2$O) and is saturated or nearly saturated with silvite (KCl) and with a magnesium content of 4.7–6%, 0.8–1.2% lithium and 2–4% total sulfur and is saturated or nearly saturated with lithium sulfate (Li$_2$SO$_4$.H$_2$O) is mixed with another brine that is saturated with bischofite (MgCl$_2$.6H$_2$O) and is saturated or nearly saturated with carnallite (KCl MgCl$_2$.6H$_2$O) and with a lithium content of between 2.5 and 6%, less than 6% magnesium, and less than 0.2% total sulfate, the resulting brine reaches a lithium sulfate content that exceeds its solubility in the brine and consequently precipitates out as monohydrated lithium sulfate.

Depending on the starting compositions of each brine, as well as on the crystallization temperature and the speed at which crystallization takes place, it is possible to obtain various degrees of purity in the monohydrated lithium sulfate. For the sake of clarity, a description of the process will be given below that refers to FIGS. 1–5.

Natural brines that exist in salt deposits such as the Atacama Salt Deposit can be concentrated by solar evaporation in a conventional manner such that various salts precipitate out that may be of commercial interests, depending on their composition, such as halite (NaCl), silvite (KCl), silvinite (NaCl, KCl), epsomite (MgSO$_4$.7H$_2$O), etc., as well as double salts of magnesium and potassium such as carnallite if the chloride content is sufficiently high. It is then possible by solar evaporation to obtain brines with lithium contents of 0.8–1.2% in the form of sulfate and with total sulfate contents of 0.1–4.5%.

In this process, two brines of different compositions are used: one brine that is saturated with potassium chloride (KCl) and/or carnallite (KCl MgCl$_2$.6H$_2$O) and with 4.7–6% magnesium and 0.8–1.2% lithium and is saturated with or nearly saturated with lithium sulfate and has a total sulfate content of 1.2–4.0%, and another brine with a composition at the saturation limit of bischofite (MgCl$_2$.6H$_2$O) and carnallite (KCl MgCl$_2$.6H$_2$O) and is saturated or nearly saturated with lithium sulfate with a content of 2.5–6% lithium, less than 6% magnesium, and less than 0.2% total sulfate content. These two types of brines correspond to the composition ranges indicated in areas A and B of FIG. 1. When these two brines are mixed, a brine is obtained with a composition corresponding to area C of FIG. 1, whereby the solubility value of monohydrated lithium sulfate is exceeded and the latter precipitates, ultimately giving rise to a brine with lower contents of lithium and total sulfate, as indicated by area D in FIG. 1.

Figure 2:
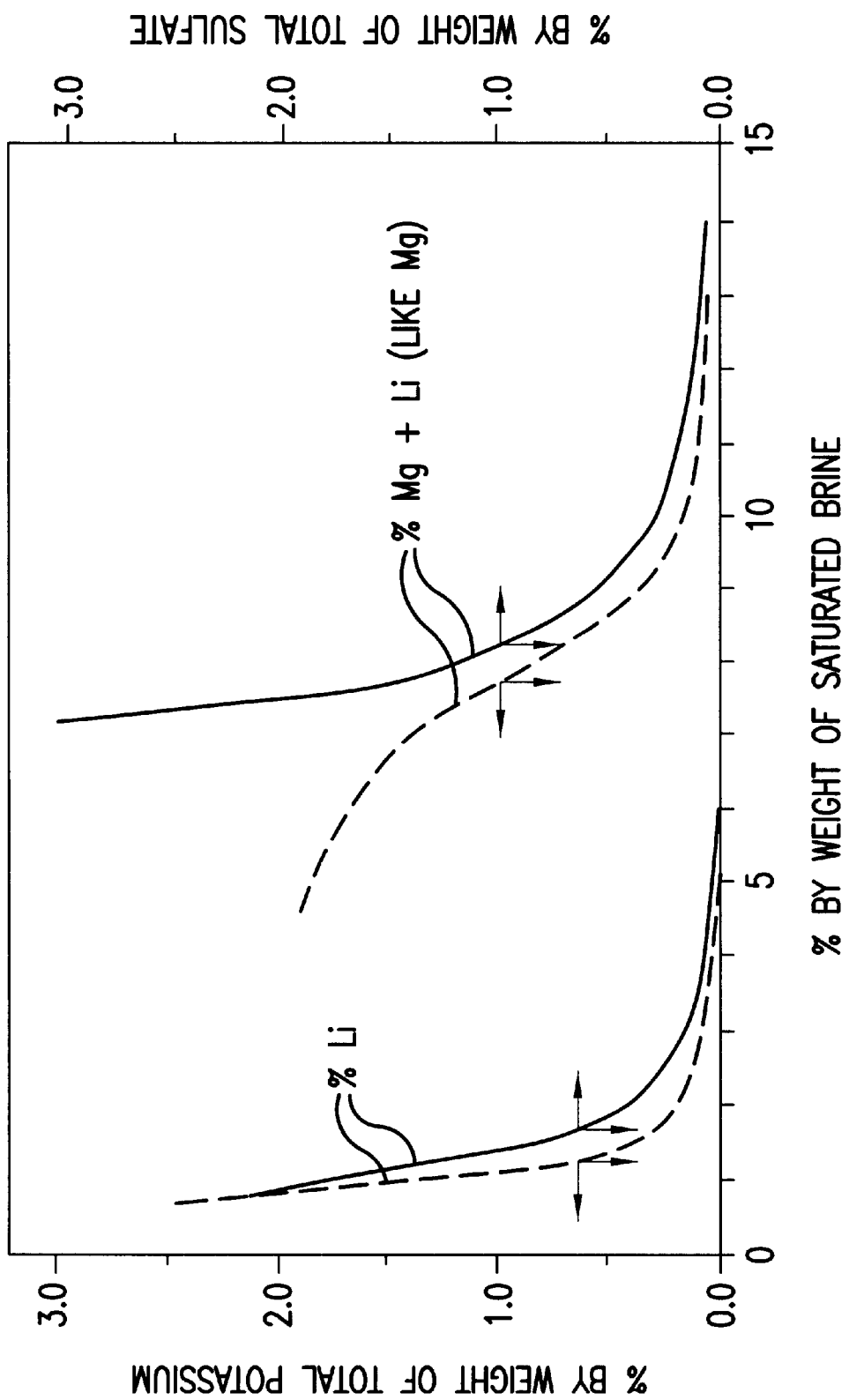

When the two brines are mixed, at the same time as the solubility of the lithium sulfate decreases, there is also a decrease in the solubility of potassium in the precipitation area of carnallite (KCl MgCl$_2$.6H$_2$O). When the precipitation area of carnallite is reached, the solubility of the potassium decreases rapidly, a value that corresponds approximately to 6.7–7% Mg+Li (like Mg), i.e., to a lithium content in the brine of 0.8–1%, as shown in FIG. 2. Under these conditions, carnallite also co-precipitates, contaminating the hydrated lithium sulfate that is thus precipitated.

Figure 3:
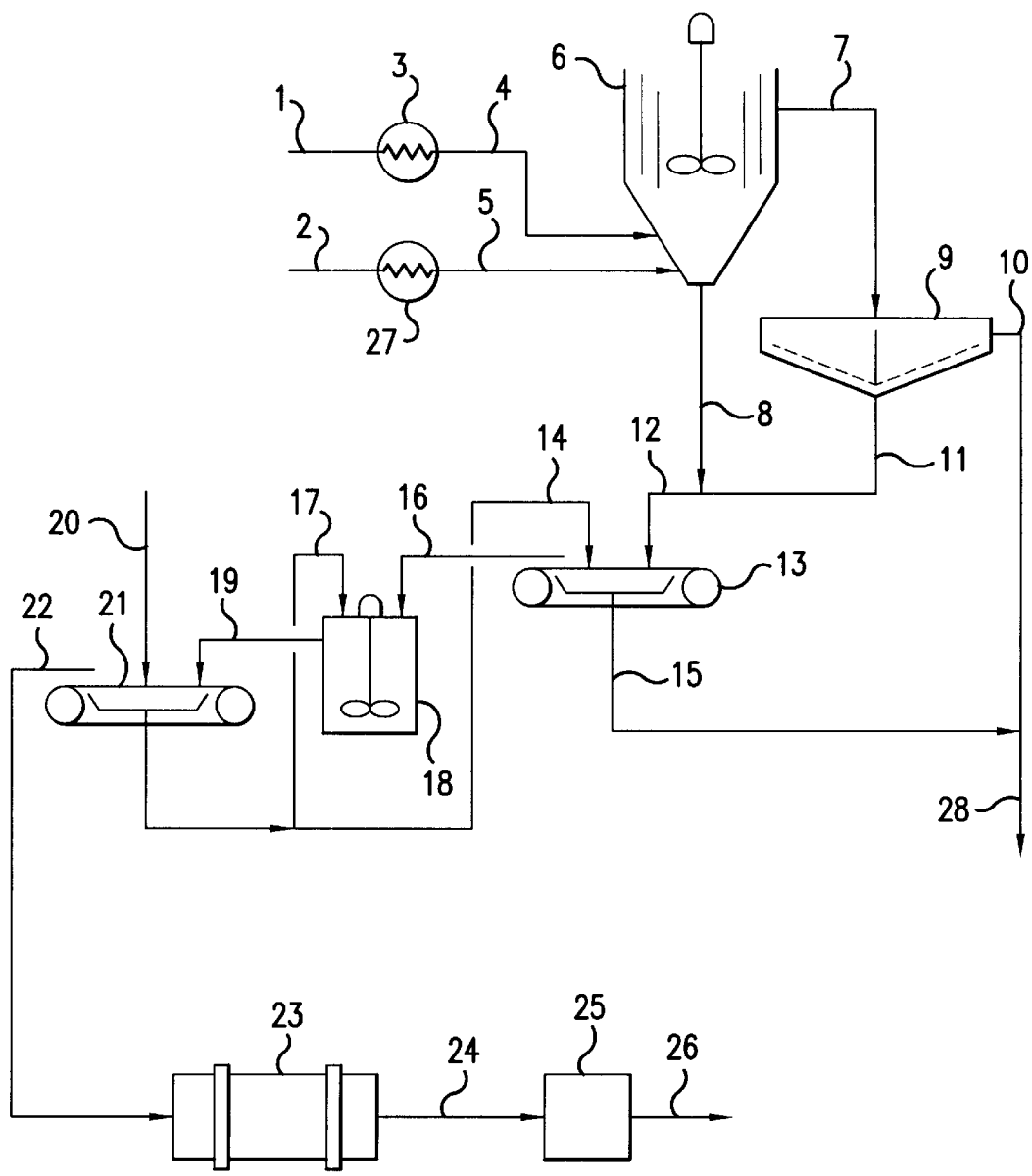
Figure 4:
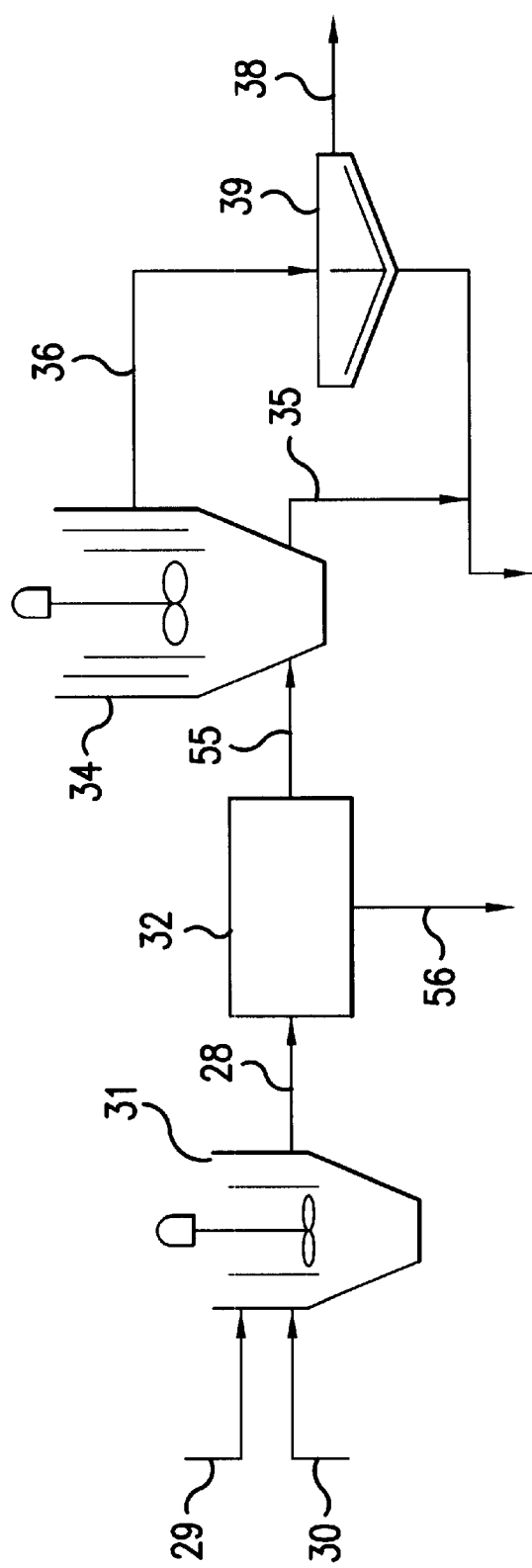

In order to keep the precipitated monohydrated lithium sulfate from being contaminated with carnallite, the two above-described brines, which are now identified as 1 and 2, respectively, in FIG. 3, are heated in respective heat exchangers 3 and 27 to a temperature of 0–100° C. in order thereby to increase the solubility of the carnallite in the brine; the carnallite increases in solubility faster with temperature than does monohydrated lithium sulfate, as indicated in Table 1.

TABLE 1

Water Solubility of Monohydrated Lithium Sulfate (Li$_2$SO$_4$ · H$_2$O) and Carnallite (KCl MgCl$_2$ · 6H$_2$O) as a Function of Temperature:

|  | Temperature (° C.) | Solubility (gpl) |
|---|---|---|
| Li$_2$SO$_4$ · H$_2$O | 25 | 233 |
|  | 100 | 282 |
| KCl MgCl$_2$ · 6H$_2$O | 25 | 690 |
|  | 100 | 1250 (approx.)* |

*Carnallite breaks down when heated.

Preheated brines 4 and 5, at a temperature of between 0 to 100° C., preferably at a temperature of between 30 to 70° C., are now sent to a conventional crystallizer 6 where they are mixed together, in a mixing proportion of between 6:1 and 1:6 for a mean dwell time of 0.1 to 4 hours, preferably for a mean dwell time of 0.5 to 1 hour, in order to crystalize monohydrated lithium sulfate that contains little or no precipitated carnallite. Overflow 7 from crystallizer 6 is sent to a conventional decanter 9 in order to sediment out the finer crystals of lithium sulfate. The discharge of the dense pulp is mixed with discharge 8 from crystallizer 6. Said pulp 12 is sent to a conventional solid-liquid separation device 13 in order to remove from the retained brine other products that might contaminate the lithium sulfate. The solid-liquid separation device 13 may be used for a first filtration and the washing on a filter is carried out with water or a solution of filtrate from a second filtration and washing, at a temperature of between 0 and 100° C., preferably a temperature between 0 and 50° C., and with a volume ratio of from 0 to 100%, preferably a volume ratio of between 20 to 50%, relative to the volume of the monohydrated lithium sulfate crystals. Liquid 15 from said device is combined with overflow 10 from sedimenter 9 and resulting liquid 28 and is sent to evaporation pools if the goal is to increase the overall recovery of lithium, whereby the brine that is obtained is then fed back to the circuit.

Monohydrated lithium sulfate crystals 16 from first filtration stage 13 may be sent directly to drying if they are of sufficient purity or can be pulped again in stirred pond 18 using a portion of filtrate 17 from second filtration stage 21 or water. This repulping is done at a temperature of between 10 and 80° C., preferably at a temperature of between 30 and 50° C., for a mean dwell time of between 2 and 60 minutes, preferably for a mean dwell time of between 5 and 25 minutes, and a percentage of solid of 5–80% by weight, preferably a percentage of solid of 50–70% by weight. Discharge 19 from re-pulping pool 18 is sent to a second strip filter 21 or other conventional filter, where it is filtered and finally washed with water 20 at a temperature of between 0 and 100° C., preferably at a temperature of between 20 and 50° C., and at a volume ratio of 20–100%, preferably at a volume ratio of 30–50%, relative to the volume of the crystals. Pure monohydrated lithium sulfate crystals 22 that are obtained in this way are sent to a dryer 23 that operates at a temperature of above 75° C., preferably with air or hot air at a temperature of between 120 and 500° C., more preferably at a temperature of between 250 and 400° C. The discharge from the dryer is sent to a bottling stage in conventional form 25 in order to provide a commercial monohydrated lithium sulfate product 26. If anhydrous lithium sulfate is desired, the monohydrated lithium sulfate is dried with air or hot gas directly, at a temperature of above 200° C.

Another alternative means of treatment for the crystallization stage takes advantage of the higher crystallization speed of carnallite compared to the lower crystallization speed of monohydrated lithium sulfate. A diagram of this option is presented in FIG. 4, where the two brines that have the above-indicated compositions and are now identified as 29 and 30 are continuously fed to a first crystallizer 31, causing them to be mixed at a temperature of between 0 and 60° C., preferably at a temperature of between 5 and 30° C., with a mean dwell time of between 5 and 60 minutes, preferably with a mean dwell time of between 10 and 30 minutes, where carnallite preferably precipitates.

Resulting pulp 28 of crystals and brine is sent to a conventional solid-liquid separation device 32 such as a filter where carnallite crystals 56 are separated. Resulting brine 55 is sent to a second crystallizer 34 that operates at a temperature of between 0 and 60° C., preferably at a temperature of between 5 and 30° C., with a mean dwell time of between 10 and 120 minutes, preferably with a mean dwell time of between 20 to 60 minutes, where the hydrated lithium sulfate now crystallizes with carnallite crystal residue. Said crystals 35 are continuously removed from the crystallizer and are sent to double filtration and washing and re-pulping stages in order to eliminate the carnallite and the retained brine, followed by the stages of drying and bottling just as described in the general process and as shown in diagram form in FIG. 3. Overflow 36 from second crystallizer 34 is sent to a conventional sedimenter 39 in order to recover the fine crystals. Discharge 37 from said sedimenter is mixed with discharge 35 from the second crystallizer in order to process them in the same way as the monohydrated lithium sulfate crystals that are produced in the general process described at the beginning and shown in diagram form in FIG. 3, i.e., double filtration and washing, re-pulping and drying and bottling of the crystals, while overflow 38 from the sedimenter can be sent to solar evaporation pools and the concentrated brine will then be sent back to the process in order thereby to increase the overall lithium recovery rate of the process.

Figure 5:
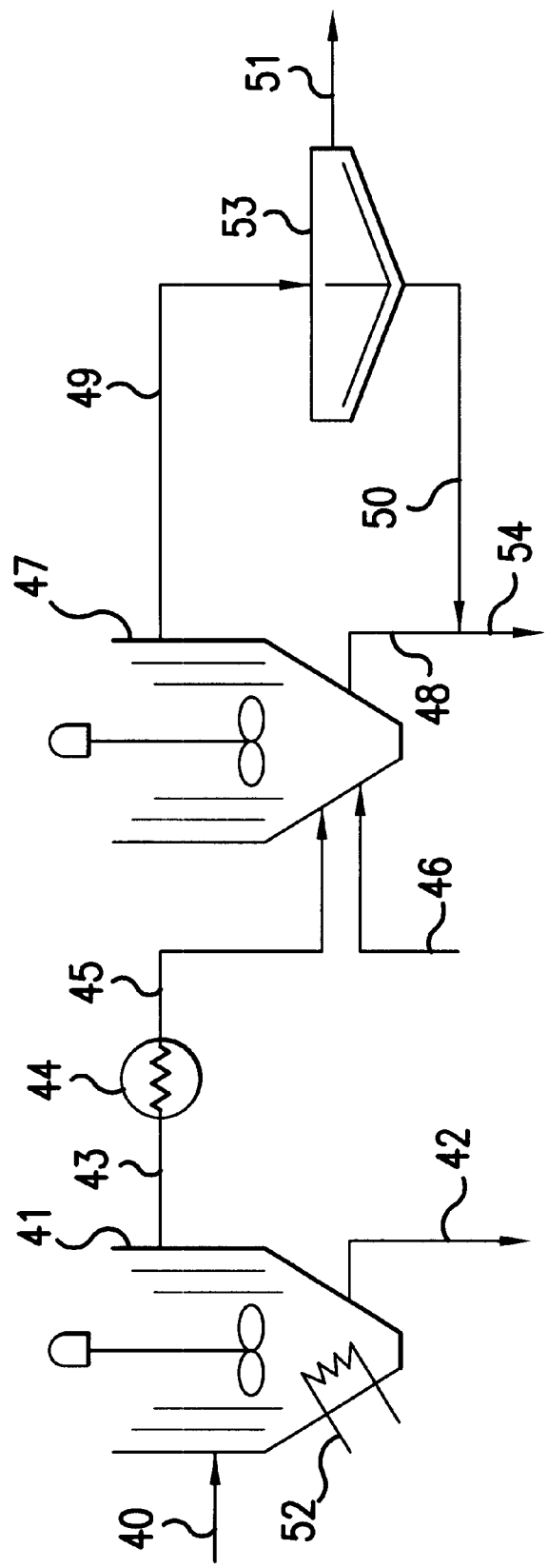

A third alternative process is also possible for the crystallization stage, a diagram of which is shown in FIG. 5. With this option the brine, which is saturated or merely saturated with halite, carnallite, and lithium sulfate 40, is continuously fed to a first crystallizer 41 where it is cooled 52 to a temperature of between 0 and 30° C., preferably to a temperature of between 5 and 15° C. in order to precipitate out carnallite and some halite 42, which substances are continuously removed from the crystallizer. Overflow 43 from said crystallizer is now heated in a conventional heat exchanger 44 to a temperature of between 10 and 80° C., preferably to a temperature of between 20 and 40° C. and continuously feeds a second crystallizer 47, which is also fed with second brine 46, which is also saturated or nearly saturated with lithium sulfate, halite, and bischofite and at a temperature of between 10 and 80° C., preferably to a temperature of between 20 and 40° C. in order to bring about the crystallization of monohydrated lithium sulfate 48, which is continuously removed from the crystallizer. Overflow 49 from the second crystallizer is sent to a conventional sedimenter to recover the finer crystals. Overflow 51 from sedimenter 53 can be sent to solar evaporation pools in order to increase the lithium concentration in the brine and is then fed back to the process, thereby increasing the overall recovery of lithium. The discharge from sedimenter 50 is combined with discharge 48 from second crystallizer 47 and is then sent to the stages of double filtration and washing and re-pulping to remove any other precipitated salt or trapped brine, followed by drying and bottling of the monohydrated lithium sulfate crystals, in the same way as described in the general treatment process and as shown in diagram form in FIG. 3.

Below is an example of the application of the process, according to the process described and as shown in diagram form in FIG. 3.

A brine that is from the Salt Deposit of Atacama and is pre-evaporated in solar evaporation pools and heated to 60° C., hereinafter brine A, was mixed with another brine of the same origin that was also heated to 60° C., but had a different composition, hereinafter brine B, at a ratio by weight of A/B −0.67/1.00, whereby both were nearly saturated with lithium sulfate; brine A was nearly saturated with carnallite, and brine B was nearly saturated with bischofite, according to the compositions presented in Table No. 2.

TABLE 2

| Compositions of Brines A and B That Were Used (% by weight of element) | | | | | | | |
|---|---|---|---|---|---|---|---|
| Mg | Ca | Na | K | Li | Cl | $SO_4$ | $H_2O$ |
| Brine A 5.15 | 0.01 | 0.88 | 1.43 | 1.00 | 20.37 | 3.00 | 67.18 |
| Brine B 5.21 | 0.01 | 0.05 | 0.05 | 3.01 | 29.90 | 0.10 | 59.50 |

The brines were mixed while being stirred, whereby the pulp was kept at 60° C. for 30 minutes. The pulp consisting of crystals that were formed and the residual brine were allowed. to decant for 15 minutes, and then the impure decanted crystals of lithium sulfate were vacuum-filtered, whereby said crystals had the compositions indicated in Table No. 3.

TABLE 3

| Chemical Compositions of the Impure Lithium Sulfate Crystals That Were Obtained during the Crystallization Stage. | | | | | | | |
|---|---|---|---|---|---|---|---|
| Mg | Ca | Na | K | Li | Cl | $SO_4$ | $H_2O$ |
| 0.80 | 0.00 | 1.99 | 1.27 | 9.31 | 6.44 | 64.40 | 15.59 |

These values correspond to 85.81% $Li_2SO_4 \cdot H_2O$, whereby the main contaminant carnallite was precipitated and the residual brine was retained in the cake. The cake was then washed on the filter with two volumes of hot water at 40° C. The cake of monohydrated lithium sulfate crystals was re-pulped with hot water at 40° C. and at 70% solid for 10 minutes and then vacuum-filtered, and the crystals were washed with two volumes of hot water at 40° C. The final cake that was obtained in this way was dried at 250° C. for two hours, and then its composition was analyzed in the same way as the residual brine that was obtained during the crystallization stage, whereby the results indicated in Table No. 4 were obtained.

TABLE 4

The Purified Lithium Sulfate That Was Obtained and Residual Brine That Was Obtained (% by weight).

|  | Mg | Ca | Na | K | Li | Cl | $SO_4$ | $H_2O$ |
|---|---|---|---|---|---|---|---|---|
| $Li_2SO_4$ | 0.01 | 0.00 | 0.10 | 0.10 | 12.46 | 0.58 | 86.50 | 0.00 |
| Residual brine | 5.24 | 0.00 | 0.36 | 0.59 | 2.11 | 26.32 | 0.39 | 63.26 |

The content of the final product was 98.97% $Li_2SO_4$, with only 0.58% chloride. The overall recovery rate of lithium was 73.3%.

What is claimed is:

1. A process for obtaining monohydrated lithium sulfate from brines from natural salt deposits which comprises the following steps:

a) evaporating two samples of the brines by solar evaporation in order to obtain a first brine which is saturated or substantially saturated with silvinite (NaCl, KCl), monohydrated lithium sulfate ($Li_2SO_4.H_2O$), and carnallite (KCl $MgCl_2.6H_2O$) and which has a lithium content of 0.8–1.2% by weight, 4.7–6% magnesium, and 1.2–4.0% total sulfate, and a second brine that is saturated or substantially saturated with carnallite (KCl $MgCl_2.6H_2O$), monohydrated lithium sulfate, and bischofite ($MgCl_2.6H_2O$), and which has a lithium content of 2.5–6% by weight, less than 6% magnesium, and less than 0.2% total sulfate;

b) independently heating the first and second brines at a temperature of between 0 and 100° C.;

c) mixing the first and second brines in order to produce a third brine with lithium content equal to or greater than 2% by weight, whereby the saturation value of monohydrated lithium sulfate in the brine mixture is exceeded;

d) crystallizing the monohydrated lithium sulfate from the resulting third brine in a crystallizer;

e) separating the third brine by recovering fine monohydrated lithium sulfate crystals from overflow of the cyrstallizer in a sedimenter and separating the monohydrated lithium sulfate crystals from the overflow of the crystallizer from overflow of the sedimenter in a solid-state separation device;

f) filtering and washing the monohydrated lithium sulfate crystals on a filter with water or a filtrate solution from a second filtration and washing of step (h) of the monohydrated lithium sulfate crystals;

g) re-pulping the monohydrated lithium sulfate crystals with water or a filtrate solution from the second filtration and washing of step (h) of the monohydrated lithium sulfate crystals;

h) filtering and washing with water the monohydrated lithium sulfate crystals, whereby the filtrate solution is recycled to the previous re-pulping of step (g) and to the first filtration and washing of step (f) of the monohydrated lithium sulfate crystals;

i) drying the monohydrated lithium sulfate crystals of step (h) with air or hot gas;

j) re-circulating separated third brine from the solid-state separation device of step (e) with overflow from the sedimenter of step (e) and the wash water from the first filtration of step (f) for solar evaporation and recycling the evaporated brine back to the process in order thereby to increase the overall recovery of lithium from the brines.

2. A process for producing monohydrated lithium sulfate from brines from natural salt deposits in accordance with claim 1, wherein, before being mixed, the brines are preheated to a temperature of between 30 and 70° C.

3. A process for producing monohydrated lithium sulfate from brines from natural salt deposits in accordance with claim 1, wherein the mixing proportion between the two brines varies between 6:1 and 1:6.

4. A process for producing monohydrated lithium sulfate from brines from natural salt deposits in accordance with claim 1, wherein the mixing of the brines is done in a crystallizer, with a dwell time of the brine mixture of between 0.1 and 4 hours and at a temperature of between 0 and 100° C.

5. A process for producing monohydrated lithium sulfate from brines from natural salt deposits in accordance with claim 1, wherein the first filtration and washing on the filter of step (f) is carried out with water or a solution of filtrate from the second filtration and washing of step (h), at a temperature of between 0 and 100° C. and with a volume ratio of from 0 to 100% relative to the volume of the monohydrated lithium sulfate crystals.

6. A process for producing monohydrated lithium sulfate from brines from natural salt deposits in accordance with claim 1, wherein the monohydrated lithium sulfate crystals from the first filtration and washing of step (f) is re-pulped with water or a solution from the second filtration and washing of step (h), at a temperature of between 10 and 80° C., for a mean dwell time of between 2 and 60 minutes and a percentage of solid of 5–80% by weight.

7. A process for producing monohydrated lithium sulfate from brines from natural salt deposits in accordance with claim 1, wherein during the second filtration and washing of step (h) the re-pulped crystals of monohydrated lithium sulfate are filtered and washed with water at a temperature of between 0 and 100° C. and at a volume ratio of 20–100% relative to the volume of the crystals.

8. A process for producing monohydrated lithium sulfate from brines from natural salt deposits in accordance with claim 1, wherein drying is done with air or hot gas at between 120 and 500° C.

9. A process for producing monohydrated lithium sulfate from brines from natural salt deposits in accordance with claim 1, wherein crystallization is carried out continuously in two crystallization stages, in the first of which stages carnallite is preferably crystallized at a temperature of between 0 and 60° C., with a mean dwell time of between 5 and 60 minutes, whereby the pulp from the first crystallizer is sent to a solid-liquid separation device in order to separate the crystallized solid and wherein the resulting brine is sent to a second crystallizer wherein the crystallization of the monohydrated lithium sulfate is accomplished at a temperature of between 0 and 60° C., with a mean dwell time of between 10 and 120 minutes, whereby the fines from the overflow from the second crystallizer are recovered in a sedimenter and whereby the discharge from said sedimenter and that from the second crystallizer containing the monohydrated lithium sulfate crystals are subject to filtration and washing, re-pulping and filtration and final washing, followed by drying thereof.

10. A process for producing monohydrated lithium sulfate from brines from natural salt deposits in accordance with claim 1, wherein crystallization is carried out continuously in two stages, in the first of which stages the brine which is high in magnesium and close to saturation with carnallite is sent to a first crystallizer where it is cooled to a temperature of between 0 and 30° C. in order to crystallize out carnallite, which is removed from the crystallizer, whereby the overflow from the crystallizer is sent to a heat exchanger in order to reheat the resulting brine to a temperature of between 10 and 80° C., whereby said brine is mixed with the brine that is saturated or nearly saturated with lithium sulfate and bischofite and is sent to a second crystallizer in order to crystalize out the monohydrated lithium sulfate, whereby the overflow from the second crystallizer sediments out in a sedimenter and the discharge from the sedimenter and from the second crystallizer containing the monohydrated lithium sulfate crystals is subject to filtration and washing, followed by re-pulping and filtration and final washing of the monohydrated lithium sulfate crystals, followed by the drying of said crystals, whereby the overflow from the sedimenter is sent for solar evaporation and concentrated brine from the evaporation is recycled to the process in order to increase the overall recovery of lithium from the brines.

11. The method in accordance with claim 4, wherein the dwell time is between 0.5 and 1 hr.

12. The method in accordance with claim 4, wherein the temperature is between 30 and 70° C.

13. The method in accordance with claim 5, wherein the temperature of the first stage of filtration and washing is between 0 and 50° C.

14. The method according to claim 5, wherein the volume ratio is between 20 and 50% by volume.

15. The method in accordance with claim 6, wherein the temperature is between 30 and 50° C.

16. The method in accordance with claim 6, wherein the mean dwell time is between 5 and 25 minutes.

17. The method in accordance with claim 6, wherein the percentage of solid is 50 to 70% by weight.

18. The method in accordance with claim 7, wherein the temperature is between 20 and 50° C.

19. The method in accordance with claim 7, wherein the volume ratio is 30 to 50% by volume.

20. The method in accordance with claim 8, wherein the drying is done at between 250 and 400° C.

21. The method in accordance with claim 9, wherein the carnallite is crystallized at a temperature between 5 and 30° C.

22. The method in accordance with claim 9, wherein the mean dwell time of the carnallite crystallization is between 10 and 30 minutes.

23. The method in accordance with claim 9, wherein the separation device is a filter.

24. The method in accordance with claim 9, wherein the monohydrated lithium sulfate is crystallized at a temperature between 5 and 30° C.

25. The method according to claim 9, wherein the mean dwell time of the crystallization of the monohydrated lithium sulfate is between 20 and 60 minutes.

26. The method in accordance with claim 10, wherein the brine in the first stage of crystallization is cooled in the first crystallizer to a temperature between 5 and 15° C.

27. The method in accordance with claim 10, wherein the temperature of reheating is between 20 and 40° C.

* * * * *